(12) United States Patent
Yamauchi

(10) Patent No.: US 8,363,160 B2
(45) Date of Patent: Jan. 29, 2013

(54) CAPTION DETECTION DEVICE, CAPTION DETECTION METHOD, AND PULL-DOWN SIGNAL DETECTION APPARATUS

(75) Inventor: Himio Yamauchi, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1183 days.

(21) Appl. No.: 11/946,499

(22) Filed: Nov. 28, 2007

(65) Prior Publication Data

US 2008/0129866 A1    Jun. 5, 2008

(30) Foreign Application Priority Data

Nov. 30, 2006   (JP) ................................ 2006-324476

(51) Int. Cl.
*H04N 7/00* (2006.01)
*H04N 11/00* (2006.01)

(52) U.S. Cl. ........ 348/468; 348/452; 348/458; 348/465; 348/700; 348/701

(58) Field of Classification Search .................. 348/441, 348/448–449, 452, 458, 465, 468, 700–701
See application file for complete search history.

(56) References Cited

U.S. PATENT DOCUMENTS

| | | | |
|---|---|---|---|
| 6,839,094 B2 * | 1/2005 | Tang et al. ..................... | 348/607 |
| 7,129,990 B2 * | 10/2006 | Wredenhagen et al. ....... | 348/449 |
| 7,446,817 B2 * | 11/2008 | Jung et al. ..................... | 348/468 |
| 2004/0125877 A1 * | 7/2004 | Chang et al. ............. | 375/240.28 |
| 2004/0223083 A1 * | 11/2004 | Grossman et al. ............ | 348/465 |
| 2005/0196043 A1 | 9/2005 | Jung et al. | |

FOREIGN PATENT DOCUMENTS

| | | |
|---|---|---|
| JP | 07-284053 | 10/1995 |
| JP | 08-212231 | 8/1996 |
| JP | 08-317312 | 11/1996 |
| JP | 2000-23060 | 1/2000 |
| JP | 2003-179884 | 6/2003 |
| JP | 2004-072617 | 3/2004 |
| JP | 2004-80156 | 3/2004 |
| JP | 2004-201010 | 7/2004 |
| JP | 2005-339537 | 12/2005 |

OTHER PUBLICATIONS

Japanese Office Action dated Aug. 9, 2011.
Japanese Office Action dated Dec. 20, 2011.

* cited by examiner

*Primary Examiner* — Justin Shepard
*Assistant Examiner* — Charles N Hicks
(74) *Attorney, Agent, or Firm* — Pillsbury Winthrop Shaw Pittman, LLP

(57) ABSTRACT

A caption detection device including a delay unit which delays a current-frame image to output a previous-frame image, a current feature detection unit which receives the current-frame image to detect a caption feature in each region, a previous feature detection unit which receives the previous-frame image from the delay unit to detect a caption feature in each region, a caption emergence region detection unit which detects a region where the caption emerges based on a temporal change between the feature in each region of the current-frame image and the feature in each region of the previous-frame image, and a caption disappearance region detection unit which detects a region where the caption disappears based on the temporal change between the feature in each region of the current-frame image from the current feature detection unit and the feature in each region of the previous-frame image.

3 Claims, 5 Drawing Sheets

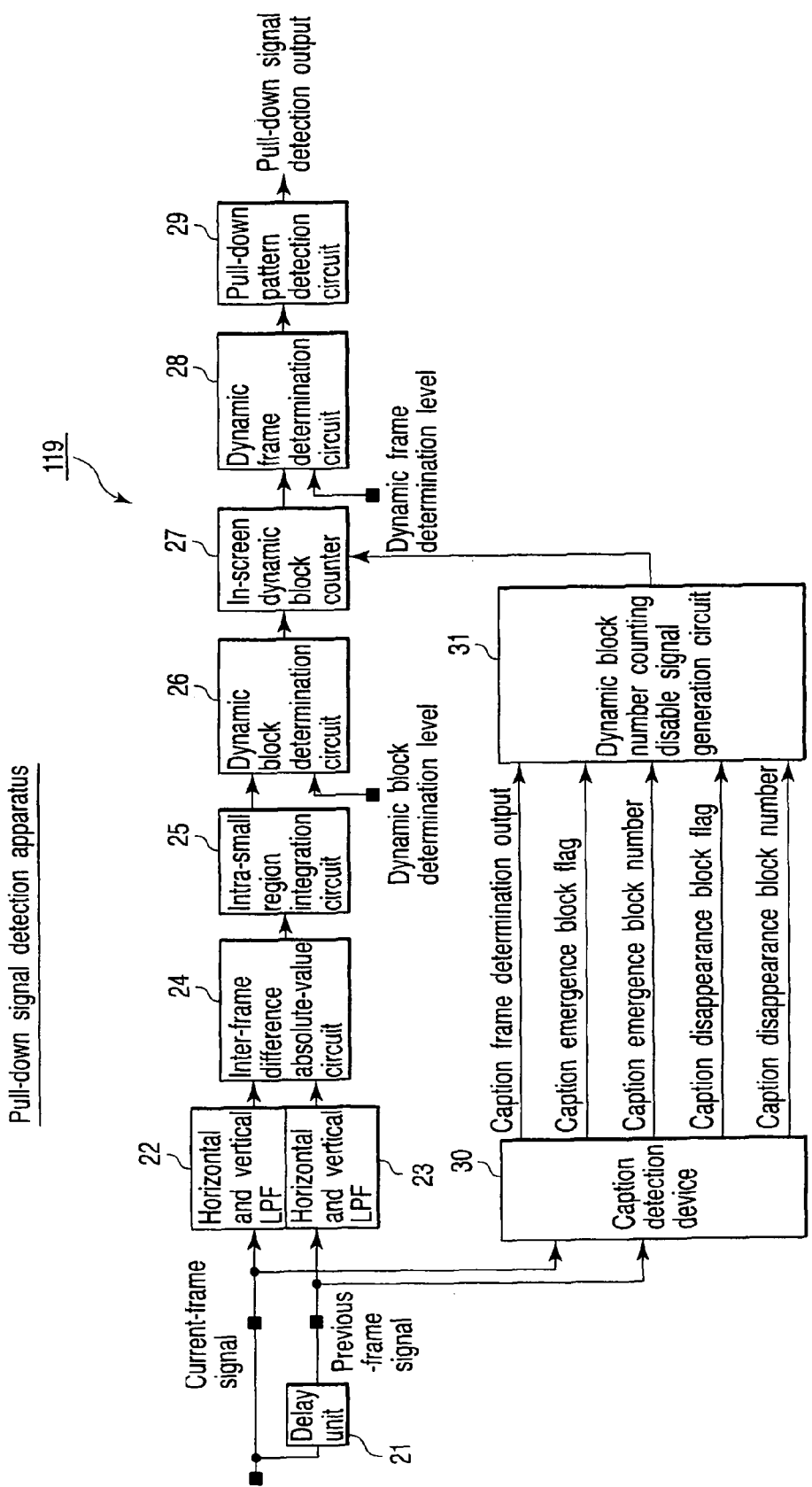
F I G. 4

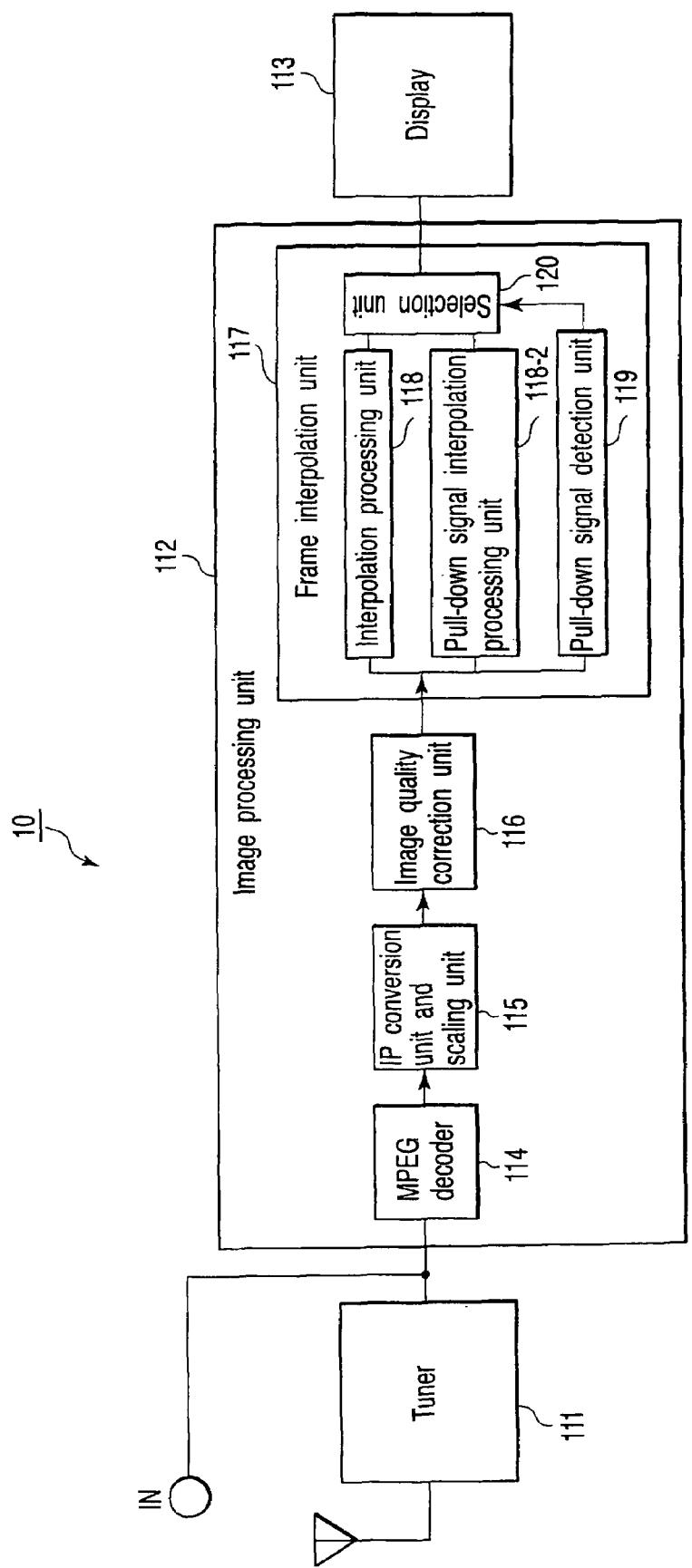
F I G. 5

CAPTION DETECTION DEVICE, CAPTION DETECTION METHOD, AND PULL-DOWN SIGNAL DETECTION APPARATUS

CROSS-REFERENCE TO RELATED APPLICATIONS

This application is based upon and claims the benefit of priority from Japanese Patent Application No. 2006-324476, filed Nov. 30, 2006, the entire contents of which are incorporated herein by reference.

BACKGROUND

1. Field

One embodiment of the present invention relates to a caption detection device and a caption detection method for detecting existence of a caption in a video frame and a pull-down signal detection apparatus in which the caption detection device and caption detection method are used.

2. Description of the Related Art

As is well known, frequently the caption for displaying a script spoken by an actor and the like is provided in a lower portion of a screen in a video signal frame of a movie and the like. Because such pieces of caption information possibly have an influence in inspecting a video signal, sometimes it is necessary to confirm whether or not the caption information is currently included in the video signal frame.

For example, in a caption detection method disclosed in Jpn. Pat. Appln. KOKAI Publication No. 8-212231 (Patent Document 1), an image is divided into plural regions, a feature amount of the caption is computed in each region, a determination whether or not the caption is included in each region is made based on the feature amount, the number of regions having the captions is projected in a row direction and a column direction, and a determination whether or not the caption is included in the image is made based on the projection result.

However, in the caption detection method disclosed in Patent Document 1, because of the determination whether or not the caption information is included in the screen at a certain moment, there is a problem in that a distinction between video motion and the caption is hardly made in determining how much motion exists in the video signal frame.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 4 is a block diagram showing an example of a configuration of a pull-down signal detection apparatus provided with a caption detection device according to an embodiment of the invention; and FIG. 5 is a block diagram showing an example of a configuration of a broadcast receiving apparatus in which a frame interpolation unit including a pull-down signal detection apparatus provided with a caption detection device according to an embodiment of the invention is used.

DETAILED DESCRIPTION

Various embodiments according to the invention will be described hereinafter with reference to the accompanying drawings. In general, according to one embodiment of the invention, a caption detection device comprising:

a delay unit which delays a current-frame image to output a previous-frame image;

a current feature detection unit which receives the current-frame image to detect a caption feature in each region;

a previous feature detection unit which receives the previous-frame image from the delay unit to detect a caption feature in each region;

a caption emergence region detection unit which detects a region where the caption emerges based on a temporal change between the feature in each region of the current-frame image from the current-feature detection unit and the feature in each region of the previous-frame image from the previous feature detection unit; and a caption disappearance region detection unit which detects a region where the caption disappears based on the temporal change between the feature in each region of the current-frame image from the current feature detection unit and the feature in each region of the previous-frame image from the previous feature detection unit.

An embodiment of the invention will be described in detail with reference to the drawings.

<Caption Detection Device According to One Embodiment of the Present Invention>

(Configuration)

Figure 1:
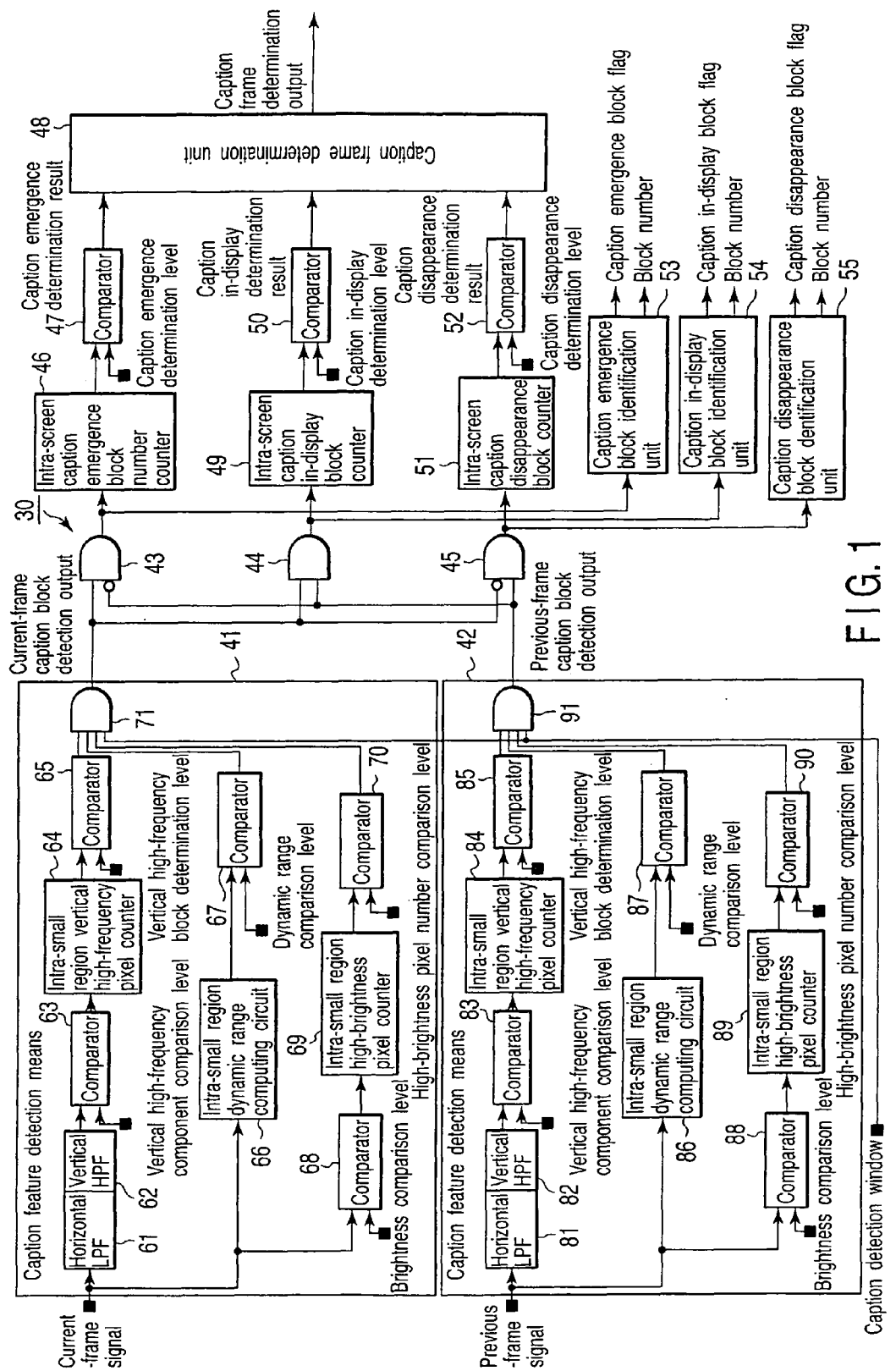
FIG. 1 is a block diagram showing an example of a configuration of a caption detection device according to an embodiment of the invention.

A caption detection device according to an embodiment of the invention will be described with reference to FIG. 1. FIG. 1 is a block diagram showing an example of a configuration of a caption detection device according to an embodiment of the invention.

Referring to FIG. 1, a caption detection device 30 includes a current-frame caption block detection output unit 41 to which a current-frame signal is supplied, a previous-frame caption block detection output unit 42 to which a previous-frame signal is supplied, a logic circuit 43 to which outputs of the current-frame caption block detection output unit 41 and previous-frame caption block detection output unit 42 are supplied, a logic circuit 44, and a logic circuit 45.

The caption detection device 30 also includes an intra-screen caption emergence block counter 46 which counts a signal from the logic circuit 43, a comparator 47 which performs a comparison with a caption emergence determination level, an intra-screen caption in-display block counter 49 which counts a signal from the logic circuit 44, a comparator 50 which performs a comparison with a caption in-display determination level, an intra-screen caption disappearance block counter 51 which counts a signal from the logic circuit 45, a comparator 52 which performs a comparison with a caption disappearance determination level, a caption frame determination unit 48, a caption emergence block identification unit 53 which receives a signal from the logic circuit 43, a caption in-display block identification unit 54 which receives a signal from the logic circuit 44, and a caption disappearance block identification unit 55 which receives a signal from the logic circuit 45.

The caption feature detection unit 41 includes a horizontal LPF 61 and a vertical HPF 62 to which the current-frame signal (brightness signal) is supplied, a comparator 63 which performs a comparison with a vertical high-frequency component comparison level, an intra-small region vertical high-frequency pixel counter 64, a comparator 65, and a logic circuit 71. An output of the counter 64 is supplied to the comparator 65, the comparator 65 compares the output of the counter 64 to a vertical high-frequency block determination level, and the comparator 65 supplies the comparison result to the logic circuit 71.

The caption feature detection unit 41 also includes an intra-small region dynamic range computing circuit 66 and a comparator 67. The current-frame signal (brightness signal) is supplied to the intra-small region dynamic range computing circuit 66, which computes a dynamic range in a small region of the current-frame signal. The comparator 67 compares the dynamic range in the small region to a dynamic range comparison level.

The caption feature detection unit 41 also includes a comparator 68, an intra-small region high-brightness pixel counter 69, and a comparator 70. The current-frame signal (brightness signal) is supplied to the comparator 68, which compares the current-frame signal to a brightness comparison level. The intra-small region high-brightness pixel counter 69 receives the comparison result of the comparator 68 to count the number of high-brightness pixels in the small region. The comparator 70 compares the count result to a high-brightness pixel number comparison level.

Similarly, the caption feature detection unit 42 which processes the previous-frame signal has substantially the same structure as the caption feature detection unit 41. The caption feature detection unit 42 includes a horizontal LPF 81 and a vertical HPF 82 to which the previous-frame signal (brightness signal) is supplied, a comparator 83 which performs a comparison with the vertical high-frequency component comparison level, an intra-small region vertical high-frequency pixel counter 84, a comparator 85, and a logic circuit 91. An output of the counter 84 is supplied to the comparator 85, the comparator 85 compares the output of the counter 84 to the vertical high-frequency block determination level, and the comparator 85 supplies the comparison result to the logic circuit 91.

The caption feature detection unit 42 also includes an intra-small region dynamic range computing circuit 86 and a comparator 87. The previous-frame signal (brightness signal) is supplied to the intra-small region dynamic range computing circuit 86, which computes the dynamic range in the small region of the previous-frame signal. The comparator 87 compares the dynamic range in the small region to the dynamic range comparison level.

The caption feature detection unit 42 also includes a comparator 88, an intra-small region high-brightness pixel counter 89, and a comparator 90. The previous-frame signal (brightness signal) is supplied to the comparator 88, which compares the previous-frame signal to the brightness comparison level. The intra-small region high-brightness pixel counter 89 receives the comparison result of the comparator 88 to count the number of high-brightness pixels in the small region.

The comparator 90 compares the count result to the high-brightness pixel number comparison level.

A caption detection window is supplied to the logic circuits 71 and 91.

(Operation)

Figure 2:
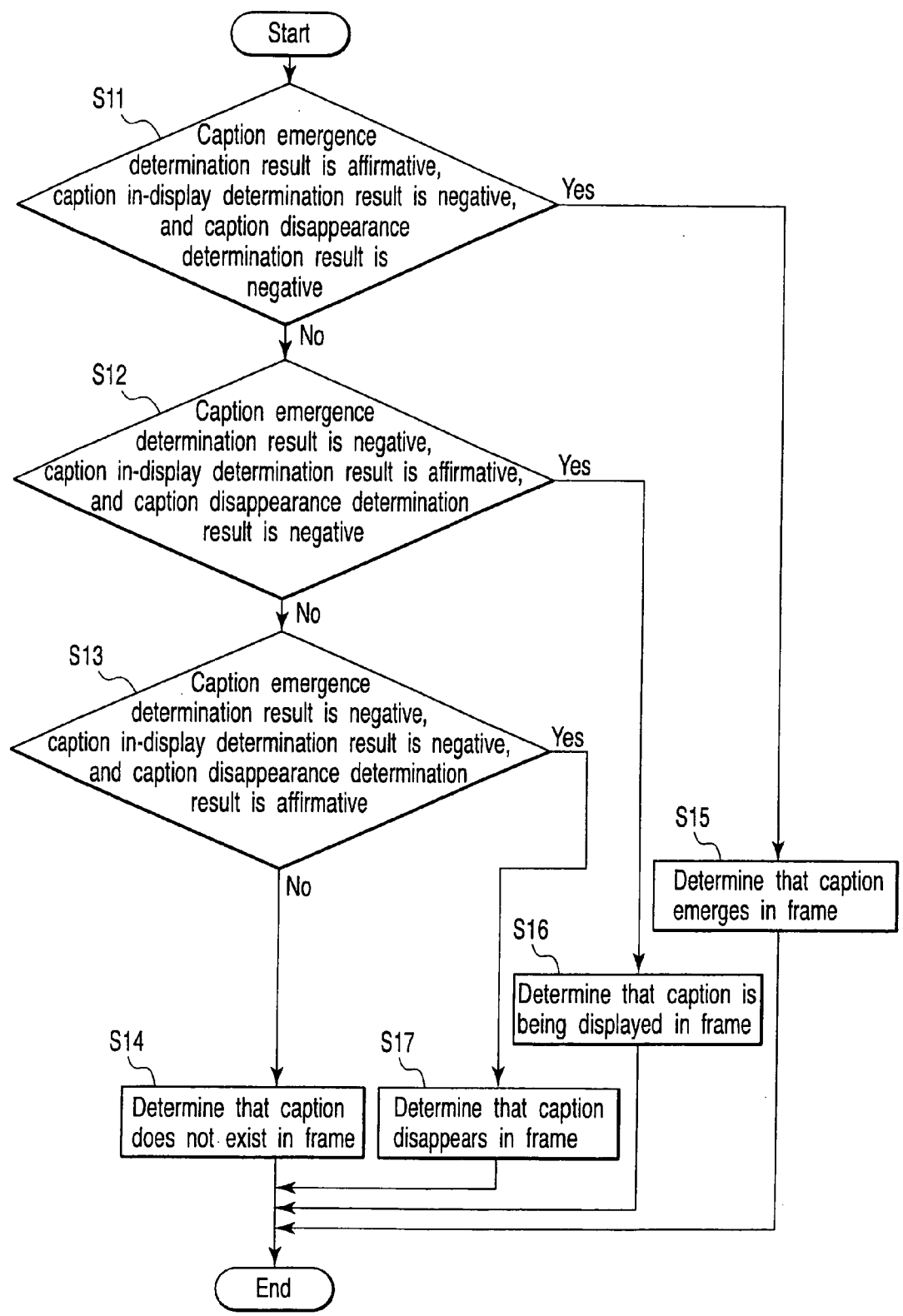
FIG. 2 is a flowchart showing an example of a determination method in a caption detection device according to an embodiment of the invention.
Figure 3:
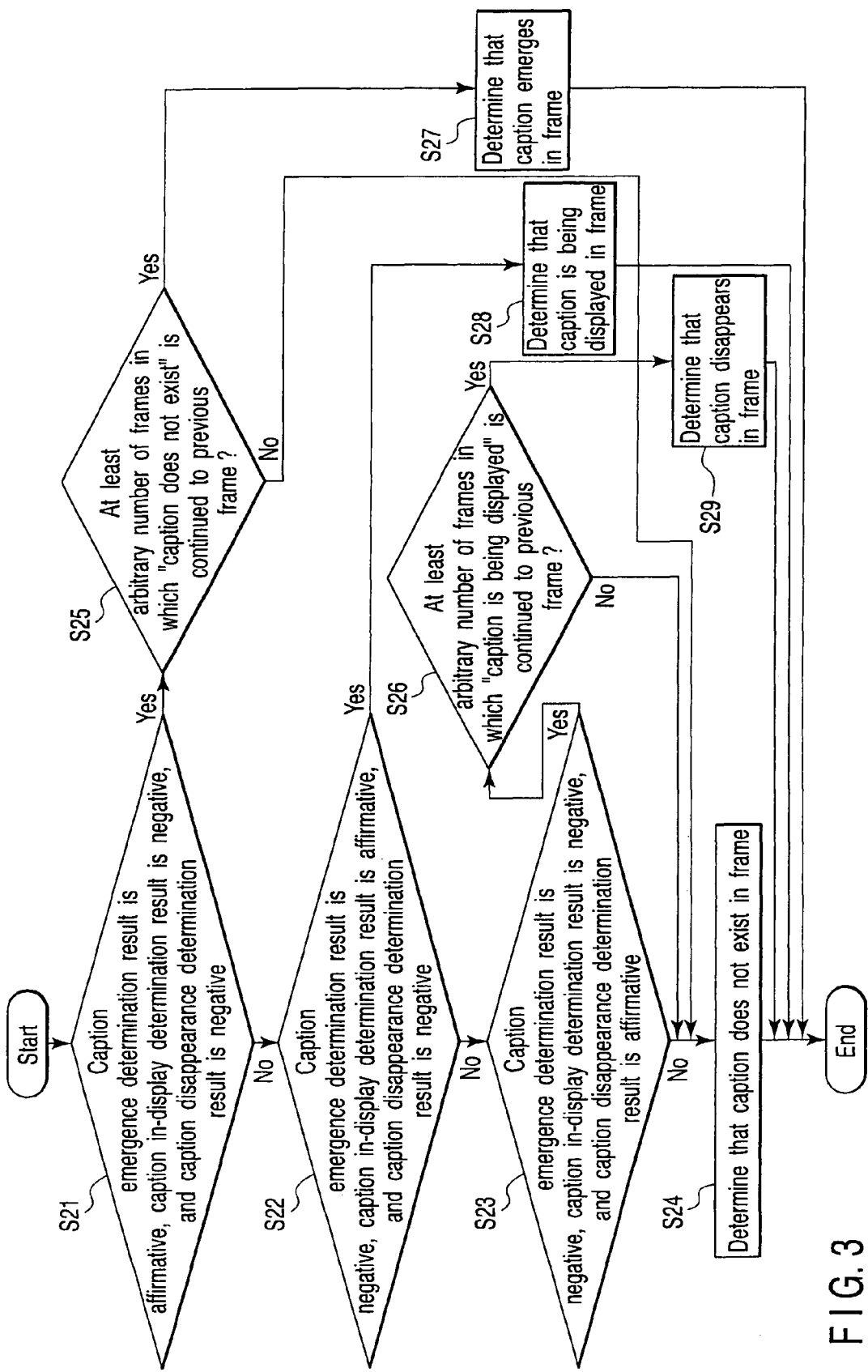
FIG. 3 is a flowchart showing another example of a determination method in a caption detection device according to an embodiment of the invention.

The caption detection unit 30 having the above configuration detects the existence, emergence, and disappearance of the caption by the following operations. FIG. 2 is a flowchart showing an example of a determination method in the caption detection device of the embodiment. FIG. 3 is a flowchart showing another example of the determination method in the caption detection device of the embodiment.

Each step of the flowcharts of FIGS. 2 and 3 can be replaced with a circuit block. Therefore, all the steps of each flowchart can be redefined as blocks.

First Processing Operation

A first processing operation performed by the caption detection unit 30 of the embodiment will be described in detail. Referring to the flowchart of FIG. 2, in the caption detection unit 30, when the result of the comparator 47 (comparison with the caption emergence determination level) is affirmative and, at the same time, the result of the comparator 50 (comparison with the caption in-display determination level) is negative and, at the same time, the result of the comparator 52 (comparison with the caption disappearance determination level) is negative (YES in Step S11), the caption frame determination unit 48 determines that the "caption emerges" in the frame (Step S15).

On the other hand, when the decision result of Step S11 is negative (NO in Step S11), the flow goes to Step S12. When the result of the comparator 47 (comparison with the caption emergence determination level) is negative and, at the same time, the result of the comparator 50 (comparison with the caption in-display determination level) is affirmative and, at the same time, the result of the comparator 52 (comparison with the caption disappearance determination level) is negative (YES in Step S12), the caption frame determination unit 48 determines that the "caption is displayed" in the frame (Step S16).

On the other hand, when the decision result of Step S12 is negative (NO in Step S12), the flow goes to Step S13. When the result of the comparator 47 (comparison with the caption emergence determination level) is negative and, at the same time, the result of the comparator 50 (comparison with the caption in-display determination level) is negative and, at the same time, the result of the comparator 52 (comparison with the caption disappearance determination level) is affirmative (YES in Step S13), the caption frame determination unit 48 determines that the "caption disappears" in the frame (Step S17).

On the other hand, when the decision result of Step S13 is negative (NO in Step S13), the caption frame determination unit 48 determines that the "caption does not exist" in the frame (Step S14).

Second Processing Operation

A second processing operation performed by the caption detection unit 30 of the embodiment will be described in detail. Referring to the flowchart of FIG. 3, in the caption detection unit 30, when the result of the comparator 47 (comparison with the caption emergence determination level) is affirmative and, at the same time, the result of the comparator 50 (comparison with the caption in-display determination level) is negative and, at the same time, the result of the comparator 52 (comparison with the caption disappearance determination level) is negative (YES in Step S21), the caption frame determination unit 48 determines whether or not at least the arbitrary number of frames in which the "caption does not exist" is continued to the previous frame (Step S25). When at least the arbitrary number of frames is continued (YES in Step S25), the caption frame determination unit 48 determines that the "caption emerges" in the frame (Step S27). When at least the arbitrary number of frames is not continued (NO in Step S25), the caption frame determination unit 48 determines that the "caption does not exist" in the frame (Step S24).

On the other hand, when the decision result of Step S21 is negative (NO in Step S21), the flow goes to Step S22. When the result of the comparator 47 (comparison with the caption emergence determination level) is negative and, at the same time, the result of the comparator 50 (comparison with the caption in-display determination level) is affirmative and, at the same time, the result of the comparator 52 (comparison with the caption disappearance determination level) is negative (YES in Step S22), the caption frame determination unit 48 determines that the "caption is displayed" in the frame (Step S28).

On the other hand, when the decision result of Step S22 is negative (NO in Step S22), the flow goes to Step S23. When the result of the comparator 47 (comparison with the caption emergence determination level) is negative and, at the same time, the result of the comparator 50 (comparison with the caption in-display determination level) is negative and, at the same time, the result of the comparator 52 (comparison with the caption disappearance determination level) is affirmative (YES in Step S23), the caption frame determination unit 48 determines whether or not at least the arbitrary number of frames in which the "caption is displayed" is continued to the previous frame (Step S26). When at least the arbitrary number of frames is continued (YES in Step S26), the caption frame determination unit 48 determines that the "caption disappears" in the frame (Step S29). When at least the arbitrary number of frames is not continued (NO in Step S26), the caption frame determination unit 48 determines that the "caption does not exist" in the frame (Step S24).

On the other hand, when the decision result of Step S23 is negative (NO in Step S23), the caption frame determination unit 48 determines that the "caption does not exist" in the frame (Step S24).

Thus, the caption detection device of the embodiment can determine the caption status in each frame by at least the two methods.

<Pull-Down Signal Detection Apparatus Provided with Caption Detection Device According to One Embodiment of the Present Invention>

Then, a pull-down signal detection apparatus provided with the caption detection device of the embodiment will be described. FIG. 4 is a block diagram showing an example of a configuration of the pull-down signal detection apparatus in which the caption detection device of the embodiment is used.

A pull-down signal detection apparatus 119, shown in detail in FIG. 4, includes a delay unit 21, horizontal and vertical LPFs 22 and 23, an inter-frame difference absolute-value circuit 24, an intra-small region integration circuit 25, a dynamic block determination circuit 26, an in-screen dynamic block counter 27, a dynamic frame determination circuit 28, and a pull-down pattern detection circuit 29. The current-frame signal is supplied to the delay unit 21. The current-frame signal and the previous-frame signal are supplied to the horizontal and vertical LPFs 22 and 23, respectively. The inter-frame difference absolute-value circuit 24 detects a difference between the outputs of the horizontal and vertical LPFs 22 and 23. The intra-small region integration circuit 25 performs an integration process to the difference. The dynamic block determination circuit 26 determines whether or not a dynamic block exists. The in-screen dynamic block counter 27 counts the number of dynamic blocks. The dynamic frame determination circuit 28 refers to a dynamic frame determination level to determine whether or not a dynamic frame exists. The pull-down pattern detection circuit 29 detects whether or not a pull-down pattern exists based on the determination result of the dynamic frame determination circuit 28.

In the pull-down signal detection apparatus 119 having the configuration of FIG. 4, the current-frame signal and the previous-frame signal from the delay unit 21 are supplied to the inter-frame difference absolute-value circuit 24 through the horizontal and vertical LPFs 22 and 23. The inter-frame difference absolute-value circuit 24 determines the difference between the frames in each small region, and the intra-small region integration circuit 25 performs the integration. The integration result is supplied to the dynamic block determination circuit 26, and the dynamic block determination circuit 26 performs a comparison with the dynamic block determination level to determine the block in which the motion is observed.

At this point, the dynamic block number counting disable signal generation circuit 31 performs a process by receiving a caption frame determination output, a caption emergence block flag, a caption emergence block number, a caption disappearance block flag, and a caption disappearance block number from the output of the caption detection device 31. In detecting the pull-down signal, the intra-screen dynamic block counter 27 does not count the emergence and disappearance of the caption, which are not the original motion of the screen, but counts only the motion of the real image.

Therefore, even if the caption emerges and disappears, because the intra-screen dynamic block counter 27 does not count the emergence and disappearance of the caption, the dynamic frame determination circuit 28 can make the comparison with the dynamic frame determination level to correctly determine whether the real motion exists in a given video signal. Accordingly, only the determination of the correct pull-down video signal can be made and the subsequent pull-down pattern detection unit 29 can accurately detect, e.g., a 2-3 pull-down signal and a 2-2 pull-down signal.

<Broadcast Receiving Apparatus with Frame Interpolation Apparatus Including Pull-Down Signal Detection Apparatus Provided with Caption Detection Device According to One Embodiment of the Present Invention>

FIG. 5 is a block diagram showing an example of a configuration of a broadcast receiving apparatus in which the frame interpolation apparatus including the pull-down signal detection apparatus is used. In the pull-down signal detection apparatus, the caption detection device of the embodiment is used.

In a broadcast receiving apparatus 10, the pull-down signal detection apparatus provided with the caption detection device of the embodiment is used. Referring to FIG. 5, the broadcast receiving apparatus 10 includes a tuner 111, an MPEG decoder 114, an IP conversion unit and scaling unit 115, an image quality correction unit 116, a frame interpolation apparatus 117, and a display 113. The tuner 111 outputs audio and video signals by receiving an analog surface wave, an analog satellite wave, a digital surface wave, or a digital satellite wave. The MPEG decoder 114 performs an MPEG decoding process to the audio and video signals. The IP conversion unit and scaling unit 115 performs IP conversion and a scaling process to the decoded signals. The image quality correction unit 116 performs an image quality correction process. The frame interpolation unit 117 performs a frame interpolation process to a given 60-Hz (50 Hz in Europe) video signal to output a 120-Hz (100 Hz in Europe) video signal which is a double speed. The display 113 displays a video according to the video signal to which the interpolation process is performed.

When the pull-down signal detection apparatus 119 including the caption detection device 30 of the embodiment is applied to the frame interpolation apparatus 117 of the broadcast receiving apparatus 10, the number of intra-screen dynamic block counts can be obtained based on the correct determination without influence of the presence or absence of the caption.

In the conventional technique, the existence of the caption in the video screen causes such troubles that the signal is mistakenly recognized as the pull-down signal or the pull-down signal is mistakenly recognized as the usual video signal, whereby a malfunction is generated by not selecting the original interpolation processing units 118 and 118-2.

Those skilled in the art can make the invention by various above-described embodiments, and it is further understood by those skilled in the art that various changes and modifications can easily be made, and the invention can be applied to various embodiments without inventive ability. Therefore, the present invention covers a wide range consistent with the disclosed principle and the novel characteristic features, and is not limited to the embodiments described above.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A pull-down signal detection apparatus comprising:
    a difference circuit which detects a difference between a frame of a current-frame image and a frame of a previous-frame image delayed from the current-frame image;
    a determination unit which determines a block in which motion is observed based on the difference;
    a caption detection unit including:
        a current feature detection unit which receives the current-frame image to detect a feature in each of regions obtained by dividing the current-frame image,
        a previous feature detection unit which receives the delayed previous-frame image to detect a feature in each of regions obtained by dividing the previous-frame image,
        a caption emergence region detection unit which detects a region where the caption emerges based on a temporal change representing how the caption feature changes with time between a predetermined region of the previous-frame image and a predetermined region of the current-frame image, the temporal change being derived from the feature in each of the regions of the current-frame image from the current-feature detection unit and the feature in each of the regions of the previous-frame image from the previous feature detection unit, and
        a caption disappearance region detection unit which detects a region where the caption disappears based on the temporal change representing how the caption feature changes with time between the predetermined region of the previous-frame image and the predetermined region of the current-frame image, the temporal change being derived from the feature in each of the regions of the current-frame image from the current feature detection unit and the feature in each of the regions of the previous-frame image from the previous feature detection unit;
    a counter which performs counting by subtracting blocks in which the caption emerges and disappears detected by the caption detection unit from blocks in which motion is observed determined by the dynamic block determination unit;
    a determination unit which determines a dynamic frame according to the number of counts of the counter; and
    a detection unit which outputs a signal indicating that a pull-down signal is detected, when the dynamic frame determined by the determination unit is a pull-down pattern.

2. The pull-down signal detection apparatus according to claim 1, further comprising:
    a tuner which receives and demodulates a broadcast signal to output a frame image signal, and supplies the frame image signal to the difference circuit;
    a frame interpolation unit which performs a frame interpolation process to the frame image signal from the tuner based on presence or absence of the pull-down signal detected by the detection unit; and
    a display unit which receives a video signal to display a video on a screen according to the video signal, the video signal being interpolated in the frame by the frame interpolation unit.

3. A pull-down signal detection method comprising:
    detecting a difference between a frame of a current-frame image and a frame of a previous-frame image delayed from the current-frame image;
    determining a block in which motion is observed based on the detected difference;
    receiving the current-frame image to detect a feature in each of regions obtained by dividing the current-frame image,
    receiving the delayed previous-frame image to detect a feature in each of regions obtained by dividing the previous-frame image,
    detecting a region where the caption emerges based on a temporal change representing how the caption feature changes with time between a predetermined region of the previous-frame image and a predetermined region of the current-frame image, the temporal change being derived from the feature in each of the regions of the current-frame image from the current-feature detection unit and the feature in each of the regions of the previous-frame image from the previous feature detection unit;
    detecting a region where the caption disappears based on the temporal change representing how the caption feature changes with time between the predetermined region of the previous-frame image and the predetermined region of the current-frame image, the temporal change being derived from the feature in each of the regions of the current-frame image from the current feature detection unit and the feature in each of the regions of the previous-frame image from the previous feature detection unit;
    counting by subtracting blocks in which the caption emerges and disappears detected by the caption detection unit from blocks in which motion is observed determined by the dynamic block determination unit;
    determining a dynamic frame according to the number of counts of the counter; and
    outputting a signal indicating that a pull-down signal is detected, when the dynamic frame determined by the determination unit is a pull-down pattern.

* * * * *